US 11,155,953 B2

(12) United States Patent
VanderZwagg (10) Patent No.: US 11,155,953 B2
(45) Date of Patent: Oct. 26, 2021

(54) WATER RECOVERY SYSTEM FOR A WASHING MACHINE

(71) Applicant: Eugene VanderZwagg, Holland, MI (US)

(72) Inventor: Eugene VanderZwagg, Holland, MI (US)

( * ) Notice: Subject to any disclaimer, the term of this patent is extended or adjusted under 35 U.S.C. 154(b) by 0 days.

(21) Appl. No.: 16/354,722

(22) Filed: Mar. 15, 2019

(65) Prior Publication Data

US 2019/0382943 A1    Dec. 19, 2019

Related U.S. Application Data

(60) Provisional application No. 62/643,430, filed on Mar. 15, 2018.

(51) Int. Cl.
*D06F 39/00* (2020.01)
*D06F 39/08* (2006.01)

(52) U.S. Cl.
CPC .......... *D06F 39/085* (2013.01); *D06F 39/006* (2013.01); *D06F 39/088* (2013.01); *D06F 2226/00* (2013.01)

(58) Field of Classification Search
CPC .... D06F 39/006; D06F 39/085; D06F 39/088; D06F 2226/00
USPC ........ 8/158, 159; 68/3 R, 12.19, 13 R, 18 R, 68/184, 207, 208, 902
See application file for complete search history.

(56) References Cited

U.S. PATENT DOCUMENTS

| | | | |
|---|---|---|---|
| 2,884,947 A | 5/1959 | Gerhardt |
| 2,924,959 A | 2/1960 | Israel |
| 4,561,471 A | 12/1985 | Diaz |
| 5,241,843 A | 9/1993 | Hein |
| 5,307,650 A | 5/1994 | Mertz |
| 5,431,032 A | 7/1995 | Oberg |
| 5,724,690 A | 3/1998 | Babuin et al. |
| 9,410,279 B2 | 8/2016 | Cagliani et al. |
| 9,650,738 B2 | 5/2017 | Cavalli et al. |
| 2013/0213098 A1 | 8/2013 | Hsu |
| 2014/0345063 A1 | 11/2014 | Cavalli et al. |

FOREIGN PATENT DOCUMENTS

| | | |
|---|---|---|
| DE | 4228250 | 1/1994 |
| DE | 4313539 | 10/1994 |
| GB | 2339578 | 2/2000 |

*Primary Examiner* — Levon J Shahinian
(74) *Attorney, Agent, or Firm* — Mark L. Maki; Miller Canfield (57) ABSTRACT

A water recovery system includes a storage tank that connects to a washing machine, and selectively recovers rinse water from normal operation of the washing machine and then recirculates recovered rinse water back to the washing machine for use in a next wash cycle. This reduces total water usage by the washing machine during each full cycle of the washing machine. Preferably, no wash water or rinse water is discharged to waste until it has first passed through the storage tank. The wash water is first captured or recovered in the storage tank, and then the wash water is discharged as waste during a subsequent rinse cycle. Secondly, rinse water that is recovered in the storage tank is reused in a subsequent wash cycle to reduce the total amount of fresh water needed to complete a full cycle of the washing machine through its wash and rinse cycles.

20 Claims, 6 Drawing Sheets

WATER RECOVERY SYSTEM FOR A WASHING MACHINE

FIELD OF THE INVENTION

The invention relates to a water recovery system for a washing machine, and more particularly to a water recovery system which recovers and recycles rinse water for use in a subsequent wash cycle.

BACKGROUND OF THE INVENTION

In conventional washing machines for washing clothes and other laundry, such washing machines cycle through at least one wash cycle using detergents and then cycle through at least one rinse cycle for rinsing the laundry of detergent. Typically the wash water is added to the washing machine from a household water source which may include both hot and cold water feed pipes supplying fresh water. After the wash cycle is completed, the wash water is contaminated with detergents, possible cleaning additives, and any soil removed from the laundry during the wash cycle. This wash water is discharged to a household waste or drain pipe after the wash cycle, typically during a spin cycle in which the washer drum is spun or rotated at a high speed to extract the wash water and generate a flow of wash water that passes as waste water through a discharge hose to the drain pipe. After this first spin cycle, a rinse cycle starts wherein fresh water is again added to the washer drum until it reaches a maximum fill level, and then the washer drum and laundry therein are agitated to further rinse any residual contaminants from the clothes. This rinse water is relatively clean after this agitation cycle is complete. At this time, the rinse water is extracted in another spin cycle, wherein the washing machine discharges the rinse water as waste water through the discharge hose to the drain pipe. During one complete cycle of the washing machine, at least one load of both the wash water and rinse water are supplied with fresh water and then discharged to waste.

In some washing machines, efforts have been made to recover some rinse water during one cycle of the washing machine for later reuse as wash water in the next subsequent cycle of the washing machine. However, these known recovery systems can be relatively complex and may require separate control valves to control the flow of wash water and rinse water.

In view of the foregoing, it is an object of the invention to provide a water recovery system which recovers and recycles rinse water for use in a subsequent wash cycle, wherein the water recovery system is readily connectable to existing washing machines. These known washing machines would normally discharge multiple loads of wash water and rinse water to waste during a single cycle of the washing machine, but when combined with the water recovery system of the present invention, rinse water is recirculated back to the washing machine during the next wash cycle.

In a water recovery system of the present invention, the water recovery system connects to a washing machine, and selectively recovers rinse water from normal operation of the washing machine and then recirculates recovered rinse water back to the washing machine for use in a next wash cycle. This reduces total water usage by the washing machine during each complete cycle of the washing machine. The inventive water recovery system preferably is retrofittable to an existing washing machine. It will be appreciated that the inventive water recovery system may also be adapted for installation with a washing machine during manufacture thereof, or sold together with the washing machine for installation and assembly together upon initial installation.

The water recovery system incorporates a storage tank adapted to be located close to the washing machine, such as adjacent to or under the washing machine. More preferably, the storage tank may be configured to sit on the floor and support a dryer on the top thereof. Since many washing machines are of the top load type and dryers typically are front load, this maintains a top lid of the washing machine at a height that is easily loadable, while elevating the front door of the dryer for easier access by a user.

The storage tank is configured to receive each load of wash water and rinse water from the washing machine after completion of the respective wash cycle and rinse cycle. Preferably, no wash water or rinse water is discharged to waste until it has first passed through the storage tank. Initially, the wash water is first captured or recovered in the storage tank, wherein the wash water is not reused but instead is discharged as waste to the drain pipe during a subsequent rinse cycle. Secondly, for the last load of rinse water that is captured in the storage tank, this rinse water is conserved or stored until the next wash cycle of the washing machine.

Since the recovered rinse water is relatively clean, the recovered rinse water can be recirculated or delivered to the washing machine tub during filling of the tub at the beginning of the next wash cycle. The recovered rinse water then serves as wash water and becomes contaminated during the next wash cycle with detergent and soil. This wash water is then recovered in the storage tank in the same manner as noted above and then discharged to waste during the next rinse cycle. As such, the inventive water recovery system reuses the relatively clean rinse water in a subsequent wash cycle, which thereby reduces the total amount of fresh water needed to complete a full cycle of the washing machine through its wash and rinse cycles.

In another aspect, this water recovery system is readily connectable to existing washing machines. The water recovery system uses at least one and preferably two liquid pumps that are piped to the storage tank. A first pump serves or functions as a discharge pump to pump stored water to a drain, such as the drain pipe, and a second pump serves or functions as a recirculation pump to pump stored water back to the washing machine for subsequent reuse as described above. Alternatively, a single pump in combination with a valve might perform the functions of both a discharge pump and recirculation pump.

Notably, the water recovery system does not require a separate control circuit, but simply connects each pump to the existing control circuit of the washing machine, wherein the machine control circuit serves to control the solenoids or valves which govern the feeding of hot and cold fresh water to the washer tub. Preferably, as the hot and cold solenoids are triggered by the machine control circuit, the control signals supplied to the hot and cold solenoids also may be tapped by a suitable connector and then fed to the storage tank pumps to power and control pump operation during the wash and rinse cycles. This provides a convenient control system, which simplifies the construction of the present invention. For example, the water recovery system can operate in combination with the machine cycle of the washing machine, wherein operation of the system pumps can be started and stopped when one or the other of the hot and cold valves are opened or closed.

As described herein, the water recovery system of the present invention provides various advantages over known systems.

Other objects and purposes of the invention, and variations thereof, will be apparent upon reading the following specification and inspecting the accompanying drawings.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 1:
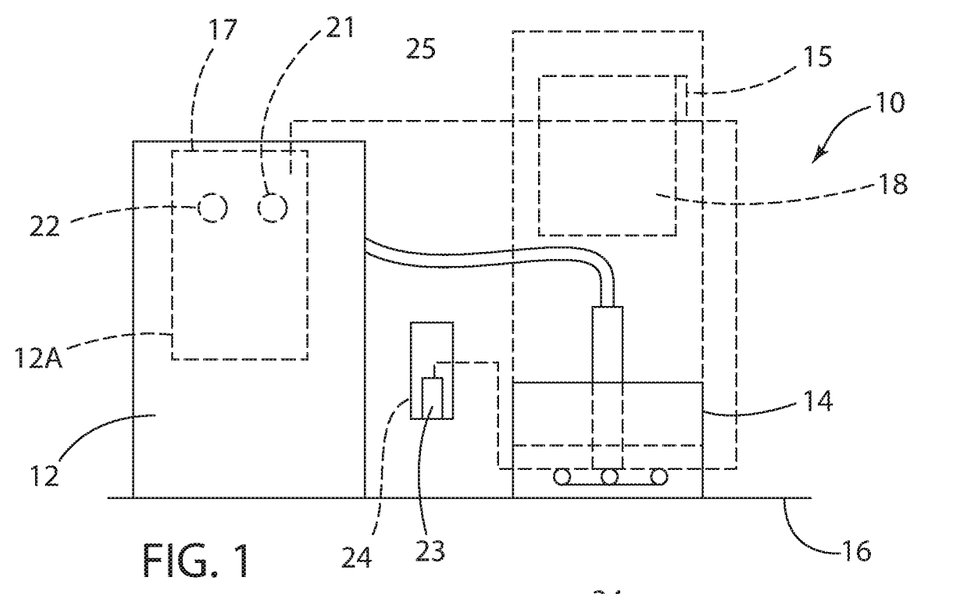
FIG. 1 is a diagrammatic rear view of a water recovery system of the present invention in combination with a washing machine for laundry.
Figure 2:
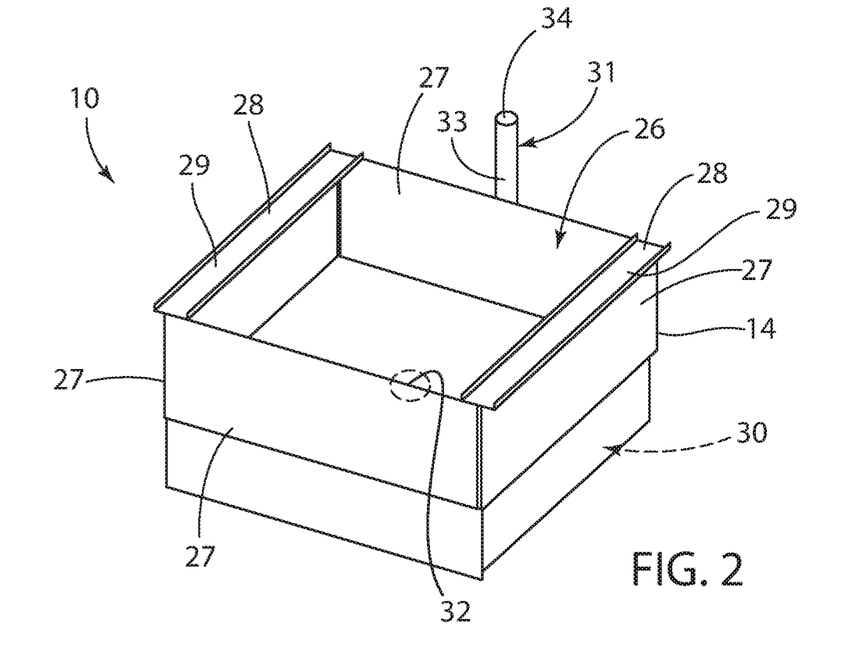
FIG. 2 is a front perspective view of the water recovery system and a storage tank therefor.

Referring to FIGS. 1 and 2, a water recovery system 10 of the present invention is shown connected to a washing machine 12 typically used to wash clothes and other laundry. The water recovery system 10 includes a box-like storage tank 14 for selectively recovering and storing the water normally discharged by the washing machine 12. In a preferred configuration, a conventional dryer 15 is shown in phantom outline supported or mounted on top of the storage tank 14. Generally, the water recovery system 10 connects to the washing machine, 12 as will be described in more detail below, wherein the water recovery system 10 selectively recovers rinse water from normal operation of the washing machine 12 and then recirculates recovered rinse water back to the washing machine 12 for use in a next wash cycle. This reduces total water usage by the washing machine 12 during each full cycle of the washing machine 12 since less fresh water is used in for the wash cycle.

The water recovery system 10 can be easily connected to an existing washing machine 12 that allows the system 10 to be readily retrofitted to existing washing machines 12 that are already installed in numerous households and other facilities. It will be appreciated that the inventive water recovery system 10 may also be adapted for installation with a washing machine 12 during manufacture thereof, or sold together with the washing machine 12 as a package for installation and assembly together upon initial installation.

As generally shown in FIG. 1, the water recovery system 10 incorporates the storage tank 14, wherein the storage tank 14 can be positioned on a floor or other support surface 16 in close proximity to the washing machine 12. As seen in FIG. 1, the storage tank 14 can be located directly adjacent to the washing machine 12 in the location where a dryer 15 typically is positioned. Due to the structural strength of the storage tank 14, the storage tank 14 allows the storage tank to serve as a base that supports the weight of the dryer 15 thereon as seen in FIG. 1. Since many washing machines 12 are of the top load type and dryers 15 typically are front load, this maintains a washer lid or door 17 of the washing machine at a height that is easily loadable by a user, while elevating the front door 18 of the dryer 15 for easier access by the user. While this might be one preferred position, the storage tank 14 also might be positioned under the washing machine 12, particularly if the washing machine 12 is the front load type, wherein the washer door 17 would be located on the front wall of the washing machine 12.

As generally seen in FIG. 1, the washing machine 12 conventionally includes hot and cold water inlets 21 and 22 which receive a supply of fresh, hot and cold water from the household or facility plumbing system and which supply the hot and/or cold fresh water to the wash tub 12A of the washing machine 12 for use during normal wash and rinse cycles.

The household plumbing system also includes a drain or drain pipe 23 typically located in a wall box 24 supported in a structural wall or the like. The drain pipe 23 normally connects to a discharge or wastewater hose 25 that allows used water to be discharged from the washing machine 12 to the drain pipe 23.

As described in more detail below, the discharge hose 25 connects directly to the storage tank 14 for receiving both wash water and rinse water that is normally generated during the wash and rinse cycles of the washing machine 12. The storage tank 14 also connects to the drain pipe 23 to allow discharge of waste water from the washing machine 12, wherein all waste water generated by the washing machine 12 during normal washing machine cycles will first pass through the storage tank 14 before eventually being discharged to the drain pipe 23.

Referring to FIGS. 1 and 2, the storage tank 14 has a box-like construction with an upper storage compartment 26 that is configured to receive each load of wash water and rinse water from the washing machine 12 after completion of the respective wash cycle and rinse cycle. The storage tank 14 has rigid upright side walls 27 preferably formed of metal so that the tank 14 is rigid and waterproof. The upper side edges of the side walls 27 vertically support a pair of rigid support rails 28 that each define a support surface 29 that is configured to support the lower edges or feet of an appliance such as the dryer 15 or the washing machine 12. These appliances would most commonly be supported on the storage tank 14 to save space in the laundry area, but the storage tank 14 can support other heavy appliances or structures if there was a desire to do so.

Figure 3:
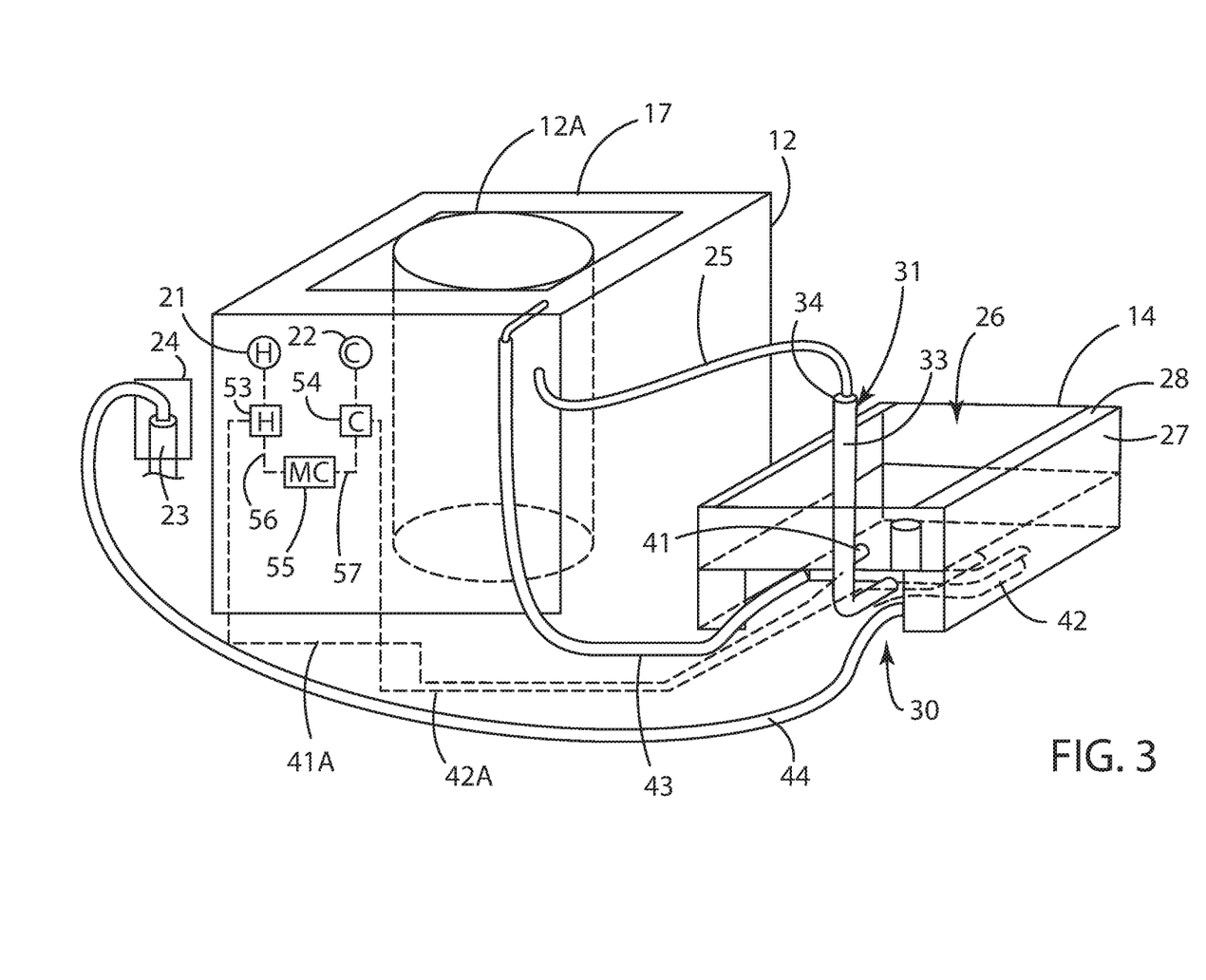
FIG. 3 is a rear perspective view of the water recovery system diagrammatically connected to a washing machine.
Figure 4:
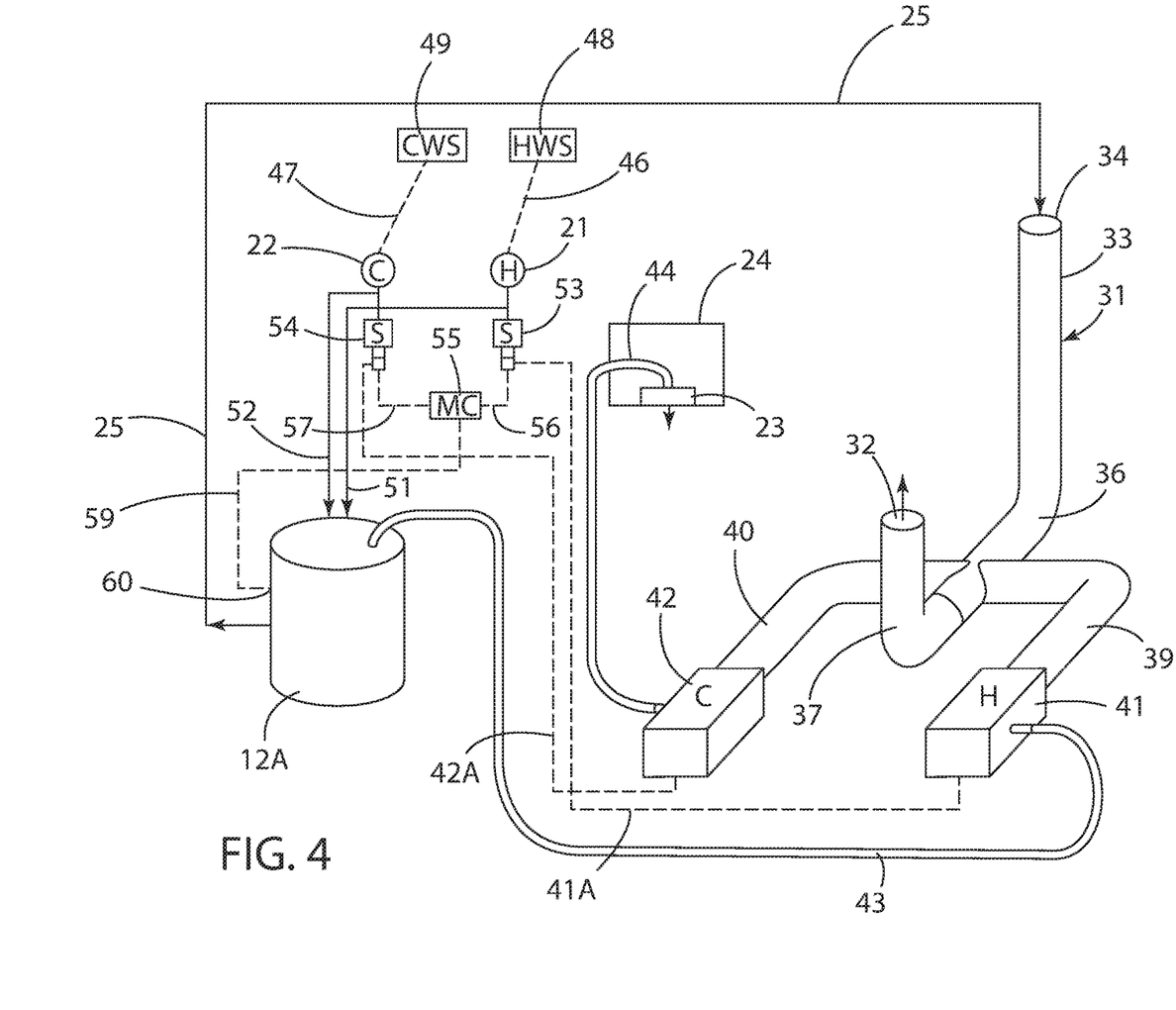
FIG. 4 is a partial perspective view of the water recovery system without the storage tank.

Referring to FIGS. 2 and 4, the storage tank 14 also includes a lower plumbing compartment 30 preferably disposed below the water storage compartment 26, and includes piping 31 disposed in such plumbing compartment 30 that connects to a tank port 32. The tank port 32 opens into the water storage compartment 26 and receives water through the interconnected piping 31. The tank port 32 also allows stored water to flow out of the storage compartment 26 as described below. The piping 31 comprises an open-ended stand pipe 33 that projects upwardly and defines an upward opening tank inlet 34 that connects to the washer discharge hose 25 as seen in FIGS. 3 and 4. As such, the stand pipe 33 receives all water discharged from the washing machine 12 as it cycles through the wash and rinse cycles.

The wash and rinse water fed to the stand pipe 33 from the discharge hose 25 flows downwardly to feed pipe 36 that in turn connects to a riser 37 connected to the tank port 32. This allows the wash and rinse water to flow into the storage compartment 26, which occurs when the washing machine 12 operates through the spin or extraction cycles that occur at the end of the wash and rinse cycles. During a normal spin cycle, the wash tub 12A typically spins at a high speed to extract wash water and rinse water from the laundry therein. However, it is possible that a washing machine 12 might use other extraction methods to extract wash and rinse water from the laundry.

The riser 37 permits bidirectional flow of water both into the storage compartment 26 and out of the storage compartment 26. In this regard, the feed pipe 36 also has a junction intermediate the stand pipe 33 and riser 37 that allows water to flow to a recirculation pipe 39 or a discharge pipe 40. In the preferred embodiment, the recirculation pipe 39 and the discharge pipe 40 are each located upstream of and function to feed water to respective first and second water pumps 41 and 42.

The recirculation pipe 39 and first pump 41 in turn connect to a recirculation hose or line 43 and pump water to recirculate collected rinse water back to the washer drum 12A for use in a subsequent wash cycle. The discharge pipe 40 and second pump 42 in turn connect to and pump collected wash water to a discharge hose or line 44 that discharges this waste water to the drain 23 described above.

After used water is collected in the storage compartment 26 and the spin or extraction cycle of the washing machine 12 terminates, the washing machine 12 may operate in the next subsequent cycle, which may be a wash cycle or rinse cycle. Depending upon the type of cycle, one or the other of the first and second pumps 41 and 42 will be operated in response to the washing machine cycle to either discharge the collected wash water to the drain 23 as waste water, or recirculate the collected rinse water back to the washing machine 12 for subsequent mixing with fresh water as part of the next cycle. The following will provide a more detailed description of the pump operation.

Figure 5:
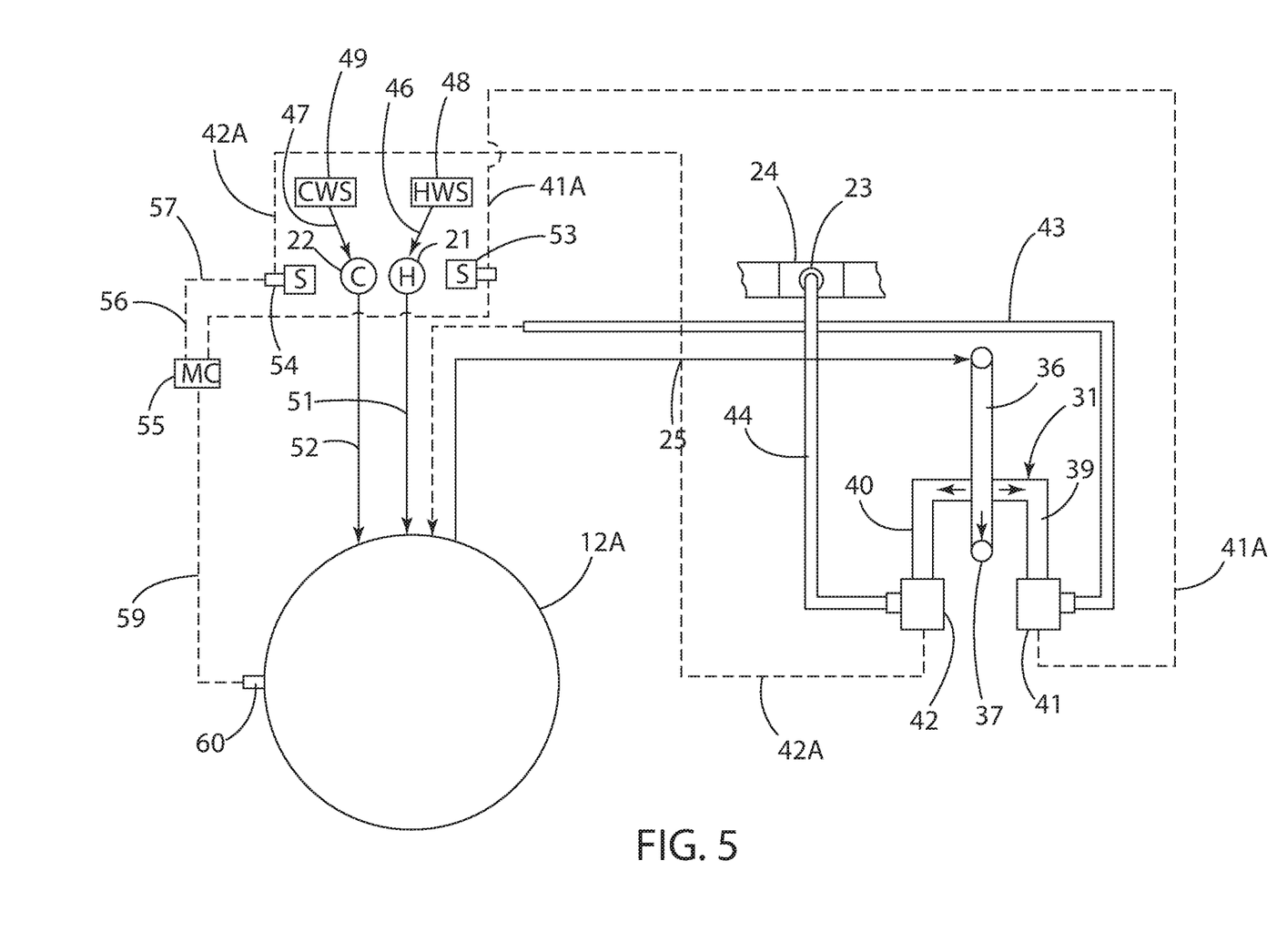
FIG. 5 is a general schematic view thereof.

Referring to FIGS. 3-5, the recirculating line 43 enters the washing machine housing and discharges into the wash drum 12A when the first pump 41 is operating. As described below, this recirculated water is the rinse water that has been collected in the storage compartment 26. However, when the collected water in the compartment 26 is wash water, the wash water preferably is not reused or recirculated but instead the wash water is discharged to waste through the discharge line 44 when the second pump 42 is operating. The water recovery system 10 of the invention uses control signals already generated by the washing machine 12 during normal operation. This allows the water recovery system 10 to be simply connected to the washer control circuit without requiring additional electronic controls.

In more detail as to the control system, the washing machine 12 includes the afore-mentioned hot and cold water inlets 21 and 22 which include external fittings that connect to hot and cold water supply hoses 46 and 47 which connect to household water supply fittings 48 and 49. Typically, the water supply fittings 48 and 49 are wall-mounted plumbing fixtures supplied with hot and cold water by the facility or household plumbing system. The washing machine 12 also includes internal water feed lines 51 and 52 which feed the hot and cold water to the wash drum 12A in a conventional manner. Also, the hot and cold water inlets 21 and 22 preferably include or connect to valves that are selectively operated by electronically controlled valve controls or actuators 53 and 54 preferably formed as solenoids or the like.

The washing machine 12 also includes a master control circuit 55 which includes signal lines 56 and 57 which selectively control the hot and cold inlets 21 and 22 by generating hot and cold water flow signals and specifically, control the solenoids 53 and 54 which actuate the valves that control water flow through the hot and cold inlets 21 and 22. The master control circuit 55 may also include a sensor line 59 that connects a sensor 60, such as a fill sensor, that detects when the wash tub 12A is filled with water during a wash cycle or rinse cycle. When the tub 12A is fill, the master control circuit 55 may then send control signals, i.e. the hot and cold water flow signals, to the valve controls 53 and 54 to close the valves. The master control circuit 55 typically would also control operation of the wash tub 12A to effect cleaning such as agitating the tub 12A during a wash or rinse cycle, or spinning the tub 12A during the rinse or extraction cycle referenced above.

Figure 6:
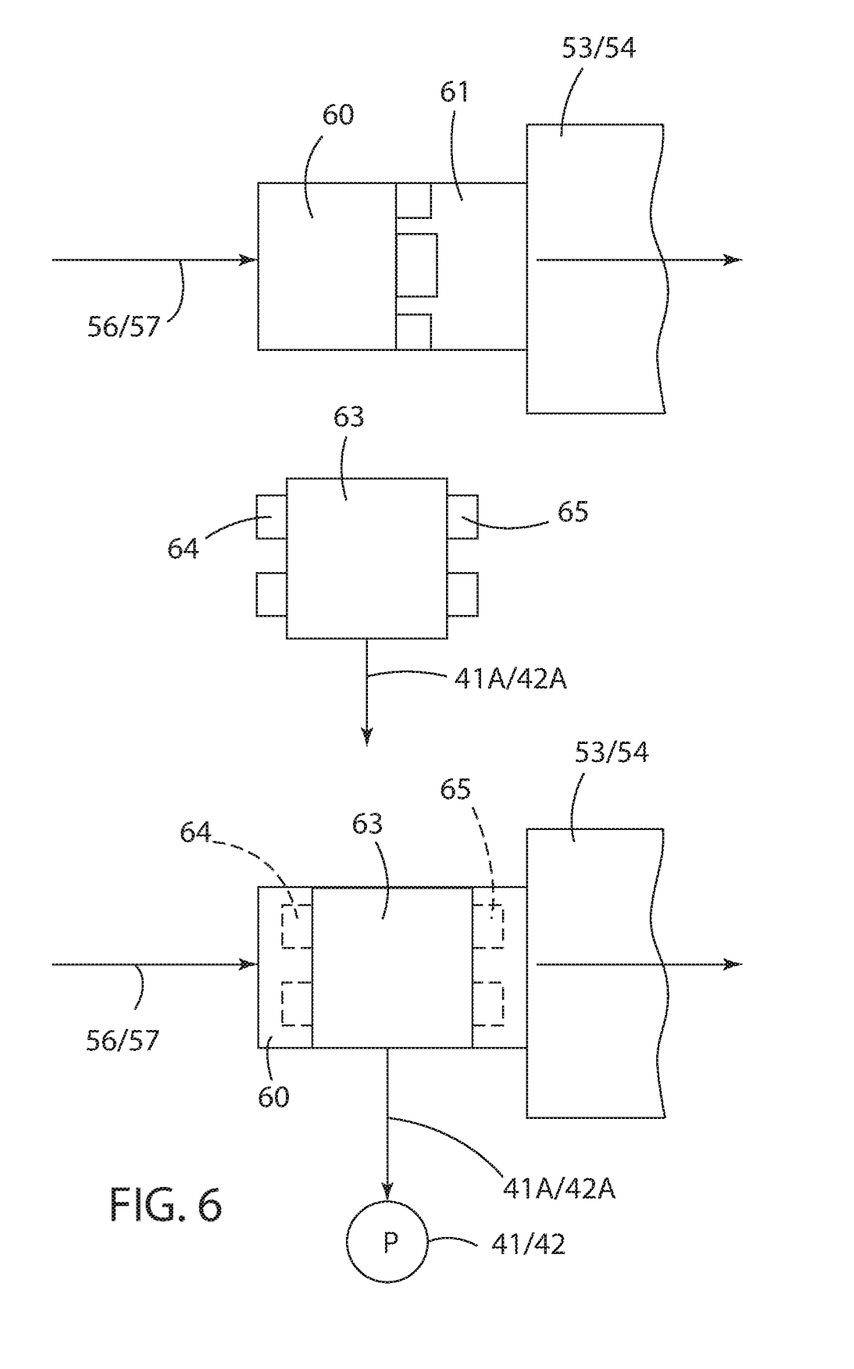
FIG. 6 is an exploded view showing a connector arrangement for controlling the water recovery system.

Referring to FIG. 6, the top diagram shows the signal line 56 or 57 connected to a respective valve control 53 or 54 by line connector 60 which plugs into a connector 61 on the valve control 53/54. Conventionally in a washing machine 12, the connectors 60 and 61 are removably plugged together. The water recovery system 10 readily plugs into this connector arrangement to tap off the signals being sent through the signal lines 56/57.

As seen in the middle diagram of FIG. 6, each of the pumps 41 and 42 includes a respective signal line 41A and 42A that has an in-line connector or T-connector 63. The connector 63 has first contacts 64 that plug together with the signal line connector 60 and has second contacts 65 that plug together with the actuator connector 61. In this configuration, control signals are still supplied by the master control circuit 55 to the valve controls 53/54, but the control signals are also tapped off by the inline connector 63 to send the same control signals to one or the other of the pumps 41 and 42 in the water recovery system 10. As such, when the master control circuit signals that the hot water inlet 21 should be opened by sending a control signal to the valve control 53 through signal line 56, this control signal also turns on the discharge water pump 41 through the signal line 41A. Similarly, when the master control circuit signals that the cold water inlet 22 should be opened by sending a control signal to the valve control 54 through signal line 57, this control signal also turns on the recirculation water pump 42 through the signal line 42A. When the control signal turns off the water inlets 21 and 22, the corresponding pumps 41 and 42 are also turned off. Preferably only one pump 41 or the other pump 42 is operated at any given time. Essentially, the control signals serve to turn on and power the pumps 41 and 42 and selectively pump collected water through either the recirculation line 43 or the discharge line 44.

Figure 7:
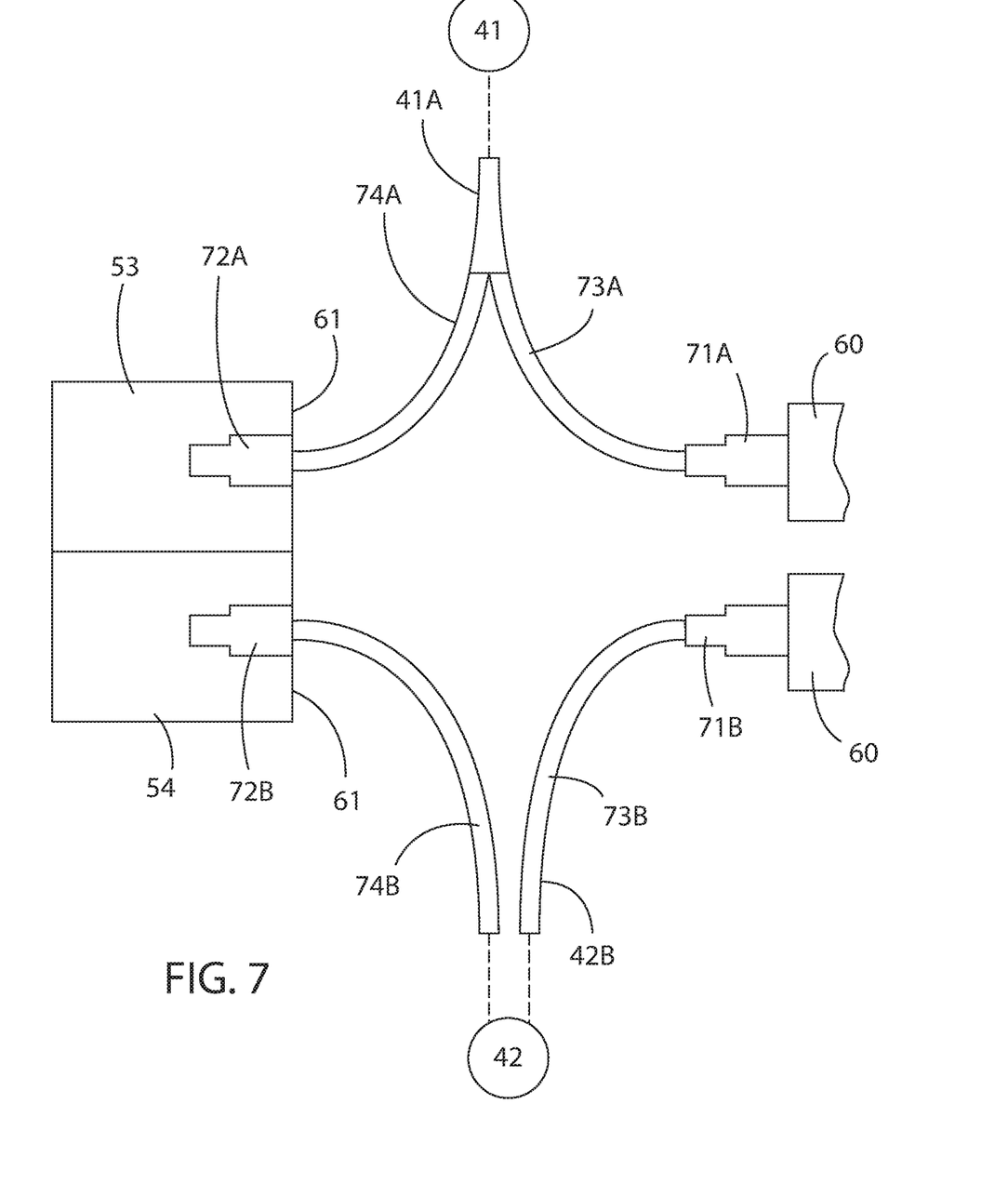
FIG. 7 is an exploded view showing an alternate connector arrangement for controlling the water recovery system.

In an alternate connector arrangement shown in FIG. 7, the signal line 56 or 57 can originally be connected by the plugs 60 to the connectors 61 on a respective valve control 53 or 54. As noted above, conventionally in a washing machine 12, the connectors 60 and 61 are removably plugged together, and the water recovery system 10 readily plugs into this connector arrangement to tap off the signals being sent through the signal lines 56/57. In the embodiment of FIG. 7, each of the pumps 41 and 42 includes the respective signal line 41A and 42A, but instead of an in-line connector or T-connector 63, the signal lines 41A and 42A can be formed as a two-wire extension cord each having a connector arrangement formed by a respective first connector 71A/71B and a respective second connector 72A/72B.

Each first connector 71A/71B has first contacts that plug together with the signal line connector 60 and each second connector 72A/72B has second contacts that plug together with the actuator connector 61. Each of the first connectors 71A/71B in turn connects to a respective first wire 73A/73B which connects to a respective one of the pumps 41 or 42, and each of the second connectors 72A/72B in turn connects to a respective second wire 74A/74B which also connects to a respective one of the pumps 41 or 42

In this configuration, control signals are still supplied by the master control circuit 55 to the valve controls 53/54, but the control signals are also tapped off by the first connectors 71A/72A to send the same control signals to one or the other of the pumps 41 and 42 in the water recovery system 10. The second wires 74A/74B in turn complete the circuit to the valve controls 53,54. As such, when the master control circuit signals that the hot water inlet 21 should be opened by sending a control signal to the valve control 53 through signal line 56, this control signal also turns on the discharge water pump 41 through the signal line 41A. Similarly, when the master control circuit signals that the cold water inlet 22 should be opened by sending a control signal to the valve control 54 through signal line 57, this control signal also turns on the recirculation water pump 42 through the signal line 42A. When the control signal turns off the water inlets 21 and 22, the corresponding pumps 41 and 42 are also turned off. Preferably only one pump 41 or the other pump 42 is operated at any given time. Essentially, the control signals serve to turn on and power the pumps 41 and 42 and selectively pump collected water through either the recirculation line 43 or the discharge line 44. Therefore, the connector arrangements shown in FIGS. 6 and 7 are functionally the same.

In more detail as to the operation of the machine cycle, each machine cycle includes at least one wash cycle, where wash water is supplied to the wash tub 12A, the tub is agitated to clean the laundry, and then a spin cycle begins to extract the wash water. Each machine cycle also includes at least one rinse cycle after the wash cycle is complete, wherein rinse water is supplied to the wash tub 12A, the tub is agitated to rinse and separate any residue from the laundry, and then a spin cycle begins to extract the rinse water. As each spin cycle occurs, the extracted wash or rinse water is discharged through the discharge hose 25 to the storage tank 14. Generally, no wash water or rinse water is discharged as waste to the drain 23 until it has first passed through the storage tank 14.

First, after the wash water is captured or recovered in the storage tank 14 after the wash cycle, the wash water is not reused but instead is discharged as waste to the drain pipe 23 during a subsequent rinse cycle. Secondly, for the last load of rinse water that is captured in the storage tank 14, this rinse water is conserved or stored until the next wash cycle of the washing machine 12, at which time the collected rinse water is recirculated back to the washing machine 12 through the recirculation line 44.

More specifically as to the operation of the water recovery system, the following summarizes the individual steps for a first full cycle of the washing machine 12, i.e. a machine cycle, comprising at least one wash cycle and one rinse cycle, and then the next successive full cycle or machine cycle of wash and rinse.

For the first full cycle, a first wash cycle is performed wherein the washing machine 12 is set to use hot water for such cycle. Conventionally, the washing machine control circuit 55 can be set through an input device such as push buttons to use hot water, cold water or a mix of the two temperatures. Further, the control circuit 55 also may control movement and rotation of the wash tub 12A through a selected timer.

The wash tub 12A starts to fill once the master control circuit 55 signals the valve control 53 to open the hot water inlet 21. The control signal is also tapped off and sent through the control line 41A to the water pump 41. If the water storage compartment 26 is empty, the water pump 41 may have a sensor cutout that leaves the pump 41 off in this empty condition.

When the wash tub 12A is full, the control signal closes the valve control 53 and turns off the water pump 41.

The washing machine 12 then agitates the wash tub 12A during the wash cycle to agitate the wash water, laundry and any detergent or other additives.

The wash cycle then ends with a spin or extraction cycle performed to extract the wash water from the laundry. During the spin cycle, the wash water is discharged through the discharge hose 23, to the stand pipe 33 to the storage compartment 26. Since both pumps 41 and 42 are off, the wash water can only flow into the compartment 26 as collected water.

The washing machine 12 then cycles through a rinse cycle which typically uses cold water in the conventional set up of the washing machine 12. As such, the master control circuit 55 initiates a control signal to open the cold water supply 22, such that the wash tub 12A starts to fill. The control signal is also tapped off by connector 63 and sent through the control line 42A to the water pump 42, which powers the water pump 42 on. Since the collected water is wash water, this wash water is then pumped through the discharge line 44 to the drain 23 at the same time as the wash tub 12A is being filled with fresh rinse water.

When the wash tub 12A is full, the control signal closes the valve control 54 and turns off the water pump 42.

The washing machine 12 then agitates the wash tub 12A during the rinse cycle to agitate the rinse water.

The rinse cycle then ends with a spin or extraction cycle performed to extract the rinse water from the laundry. During the spin cycle, the rinse water is discharged through the discharge hose 23, to the stand pipe 33 to the storage compartment 26. Here again, since both pumps 41 and 42 are off, the rinse water can only flow into the compartment 26 as collected water.

When the washing machine 12 has cleaned and rinsed the laundry, the machine cycle ends and the laundry can be removed from the wash tub 12A. At this time, a load of rinse water has been collected and remains stored within the storage tank 14 until used in the next machine cycle discussed below.

For the next or second machine cycle, the washing machine 12 is still set to use hot water for the wash cycle. Again, the wash tub 12A starts to fill once the master control circuit 55 signals the valve control 53 to open the hot water inlet 21. The control signal is also tapped off and sent through the control line 41A to turn on the water pump 41. Since the water storage compartment 26 contains collected rinse water from the last machine cycle, the water pump 41 pumps the collected rinse water to the wash tub 12A for reuse as wash water. The recirculated rinse water and fresh hot water fill the tub 12A until the fill sensor 60 detects that the tub 12A is full.

When the wash tub 12A is full, the control signal closes the valve control 53 and turns off of the water pump 41 and turns off the hot water. Typically, the wash water in this wash cycle is a mix of the recirculated rinse water and a smaller amount of fresh hot water. Preferably, the flow rate of the pump 41 is set to increase the amount of recirculated rinse water and reduce the amount of fresh hot water needed to fill the tub 12A.

The washing machine 12 then agitates the wash tub 12A during the wash cycle to agitate the mixed wash water, laundry and any detergent or other additives.

The wash cycle then ends with a spin or extraction cycle performed to extract the wash water from the laundry. During the spin cycle, the wash water is discharged through the discharge hose 23, to the stand pipe 33 to the storage compartment 26. In this second machine cycle, both pumps 41 and 42 remain off, and the wash water can only flow into the compartment 26 as collected wash water.

The washing machine 12 then cycles through a rinse cycle which typically uses the fresh cold water. As such, the master control circuit 55 initiates a control signal to open the cold water supply 22, such that the wash tub 12A starts to fill. The control signal is also tapped off by connector 63 and sent through the control line 42A to the water pump 42, which turns the water pump 42 on. Since the collected water is wash water, this wash water is then pumped through the discharge line 44 to the drain 23 at the same time as the wash tub 12A is being filled with fresh rinse water.

When the wash tub 12A is full, the control signal closes the valve control 54 and turns off the water pump 42.

The washing machine 12 then agitates the wash tub 12A during the rinse cycle to agitate the rinse water.

The rinse cycle then ends with a spin or extraction cycle performed to extract the rinse water from the laundry. During the spin cycle, the rinse water is again discharged through the discharge hose 23, to the stand pipe 33 to the storage compartment 26.

When the washing machine 12 has cleaned and rinsed the laundry, this second machine cycle also ends and the laundry can be removed from the wash tub 12A. For each successive machine cycle, a load of collected rinse water remains stored within the storage tank 14 until used for the wash cycle of the next machine cycle.

Essentially, the washing machine 12 can be operated through successive machine cycles wherein collected rinse water is recirculated back to the washing machine 12 for use in the next successive wash cycle.

In accord with this disclosure, typically the wash water is added to the washing machine 12 from a household water source which may include both hot and cold water sources 48 and 49 for supplying fresh water. After the wash cycle is completed, the wash water is contaminated with detergents, possible cleaning additives, and any soil removed from the laundry during the wash cycle. This wash water will be discharged to a household waste or drain pipe 23 after first being collected in the storage tank 14, and then discharged during the next rinse cycle. After this first spin cycle, a rinse cycle starts wherein fresh water is again added to the washer tub 12A until it reaches a maximum fill level, and then the washer tub 12A and laundry therein are agitated to further rinse any residual contaminants from the clothes. This rinse water is relatively clean after this agitation cycle is complete, and is collected in the storage tank 14 during the spin cycle. Since the recovered rinse water is relatively clean, the recovered rinse water can be delivered to the tub 12A at the beginning of the next wash cycle. As such, the inventive water recovery system 10 reuses the relatively clean rinse water in a subsequent wash cycle, which thereby reduces the total amount of fresh water needed to complete a cycle of the washing machine 12 through its wash and rinse cycles.

As can be appreciated, this water recovery system 10 is readily connectable to existing washing machines 12. The water recovery system 10 uses at least one and preferably two liquid pumps 41/42 that are piped to the storage tank 14. A first pump 42 serves or functions as a discharge pump to pump stored wash water to the drain 23, and a second pump 41 serves or functions as a recirculation pump to pump stored water back to the washing machine 12 for subsequent reuse as described above. Alternatively, a single pump in combination with a valve might be controlled by the signal lines 41A and 42A to perform the functions of both a discharge pump and recirculation pump. In this configuration, the signal lines 41A and 42A may switch the valve to permit fluid flow to either the discharge line 44 or the recirculation line 43 with a pump serving to pump the collected water from the storage tank 14 to one line 43 or the other 44.

Notably, the water recovery system 10 does not require a separate control circuit, but simply connects each pump 41/42 to the control circuit 55 of the washing machine 12, wherein the machine control circuit 55 serves to control the solenoids or valves 53/54 which govern the feeding of hot and cold fresh water to the washer tub 12A. This provides a convenient control system to control and power the pumps 41 and 42, which simplifies the construction of the present invention. For example, the water recovery system 10 can operate in combination with the machine cycle of the washing machine 12, wherein operation of the system pumps 41/42 can be started and stopped when one or the other of the hot and cold valves 53/54 are opened or closed Although particular preferred embodiments of the invention have been disclosed in detail for illustrative purposes, it will be recognized that variations or modifications of the disclosed apparatus, including the rearrangement of parts, lie within the scope of the present invention.

I claim:

1. A water recovery system for a washing machine comprising:
    a storage tank having a tank inlet that is configured to connect to a wastewater hose of a washing machine, a recirculation hose that is configured to connect to a wash tub of the washing machine and a discharge hose that is configured to connect to a waste drain, wherein said storage tank selectively recovers rinse water discharged from a rinse cycle of said washing machine which is received from said wastewater hose and is stored in said storage tank, and then recirculates said recovered rinse water back to said washing machine through said recirculation line for use in a next wash cycle to reduce total water usage by said washing machine during each full cycle of said washing machine, said storage tank further recovering wash water discharged from a wash cycle of said washing machine through said wastewater hose and then discharging said wash water to the waste drain through said discharge hose wherein said wash water and said rinse water recovered from said washing machine are not discharged to the waste drain until first passing through said storage tank;
    a first liquid pump connected to said storage tank and said discharge hose and operatively connectable to said washing machine so as to operate in response to water control signals received from the washing machine during said rinse cycle to pump said recovered wash water from said storage tank to the waste drain during said rinse cycle wherein said recovered wash water becomes waste water; and
    a second liquid pump connected to said storage tank and said recirculation hose and operatively connectable to said washing machine so as to operate in response to said water control signals during said wash cycle to pump said recovered rinse water from said storage tank to the wash tub of said washing machine for reuse during said wash cycle wherein said recovered rinse water becomes recirculated water reused by said washing machine during said wash cycle.

2. The water recovery system according to claim 1, wherein said tank inlet is configured to connect to the wastewater hose exiting an exterior of a washing machine such that said wash water is first recovered in said storage tank, and then said wash water is discharged as said waste water during a subsequent rinse cycle of the washing machine.

3. The water recovery system according to claim 2, wherein said rinse water that is recovered in said storage tank is reused in a subsequent wash cycle to reduce a total amount of fresh water used by said washing machine during said full cycle of the washing machine which comprises at least one said wash cycle and one said rinse cycle.

4. The water recovery system according to claim 1, wherein said rinse water that is recovered in said storage tank is reused in a subsequent wash cycle to reduce a total amount of fresh water used by said washing machine during said full cycle of the washing machine which comprises at least one said wash cycle and one said rinse cycle.

5. The water recovery system according to claim 1, which comprises a first signal line operatively connected to a cold water controller of said washing machine for receiving said water control signals defined by cold water flow signals received from said washing machine and a second signal line operatively connected to a hot water controller of said washing machine for receiving said water control signals defined by hot water flow signals from said washing machine.

6. The water recovery system according to claim 5, wherein said first signal line operatively connects to said first liquid pump to operate said first liquid pump in response to said cold water control signals during said rinse cycle and said second signal line operatively connects to said second liquid pump to operate said second liquid pump in response to said hot water control signals during said wash cycle.

7. A water recovery system for a washing machine comprising:
a storage tank having a tank inlet configured to connect to a wastewater hose of a washing machine, a recirculation line configured to connect to a wash tub of the washing machine and a discharge line configured to connect to a waste drain, wherein said storage tank selectively recovers rinse water discharged from a rinse cycle of said washing machine which is received from said wastewater line and is stored in said storage tank, and then recirculates said recovered rinse water back to said washing machine through said recirculation line for use in a next wash cycle to reduce total water usage by said washing machine during each full cycle of said washing machine, said storage tank further recovering wash water discharged from a wash cycle of said washing machine through said wastewater line and then discharging said wash water to the waste drain through said discharge line wherein said wash water and said rinse water recovered from said washing machine are not discharged to the waste drain until first passing through said storage tank;
a pump configuration connected to said storage tank and connected to said recirculation line, which said recirculation line is connectable to said washing machine, and connected to a waste line, which said waste line is connectable to said waste drain; and
a first signal line configured to operatively connect to a cold water controller of said washing machine for receiving cold water flow signals from said washing machine and a second signal line configured to operatively connect to a hot water controller of said washing machine for receiving hot water flow signals from said washing machine wherein said pump configuration is connected to said first signal line and said second signal line and operates in response to said cold water flow signals and said hot water control signals to selectively pump said recovered rinse water to said recirculation line in response to said hot water flow signals during said wash cycle and said recovered wash water to said waste line in response to said cold water flow signals during said rinse cycle.

8. The water recovery system according to claim 7, wherein said pump configuration comprises a first liquid pump connected to said storage tank and operatively connectable to said washing machine by a first connector of said first signal line for pumping, in response to said cold water signals, said recovered wash water from said storage tank to a waste drain during said rinse cycle wherein said recovered wash water becomes waste water; and a second liquid pump connected to said storage tank and operatively connectable to said washing machine by a second connector of said second signal line for pumping, in response to said hot water signals, said recovered rinse water from said storage tank to the wash tub of said washing machine for reuse during said wash cycle wherein said recovered rinse water becomes recirculated water reused by said washing machine.

9. The water recovery system according to claim 7, wherein said wash water is first recovered in said storage tank, and then said wash water is discharged as said waste water during a subsequent rinse cycle.

10. The water recovery system according to claim 9, wherein said rinse water that is recovered in said storage tank is reused in a subsequent wash cycle to reduce a total amount of fresh water used by said washing machine during said full cycle of the washing machine which comprises at least one said wash cycle and one said rinse cycle.

11. The water recovery system according to claim 7, wherein said rinse water that is recovered in said storage tank is reused in a subsequent wash cycle to reduce a total amount of fresh water used by said washing machine during said full cycle of the washing machine which comprises at least one said wash cycle and one said rinse cycle.

12. A water recovery system for a washing machine comprising:
a storage tank having a tank inlet that is configured to receive a wastewater hose of a washing machine, a recirculation line that is configured to connect to a wash tub of the washing machine, and a discharge line that is configured to connect to a facility waste drain, wherein said storage tank selectively recovers rinse water discharged from a rinse cycle of said washing machine, which is received from said wastewater line and is stored in said storage tank, and then recirculates said recovered rinse water back to said washing machine through said recirculation line for use in a next wash cycle to reduce total water usage by said washing machine during each full cycle of said washing machine, said storage tank further recovering wash water discharged from a wash cycle of said washing machine, which is received from said wastewater line and stored in said storage tank, and then discharging said wash water to the waste drain through said discharge line wherein said wash water and said rinse water recovered from said washing machine are not discharged to the waste drain until first passing through said storage tank;

a pump configuration connected to said storage tank and connected to said recirculation line and connected to said discharge line; and a signal line configured to operatively connect to a rinse water controller of said washing machine for receiving rinse water flow signals from said washing machine and for receiving wash water flow signals from said washing machine, said pump configuration being connected to said signal line and configured to operate in response to the wash water flow control signals and rinse water control signals to selectively pump said recovered rinse water to said recirculation line in response to said wash water flow control signals during said wash cycle and pump said recovered wash water to said waste line in response to said rinse water flow control signals during said rinse cycle.

13. The water recovery system according to claim 12, wherein said wash water is first recovered in said storage tank, and then said wash water is discharged from said storage tank as said waste water during a subsequent rinse cycle.

14. The water recovery system according to claim 13, wherein said rinse water that is recovered in said storage tank is reused in a subsequent wash cycle to reduce a total amount of fresh water used by said washing machine during said full cycle of the washing machine, said full cycle comprising at least one said wash cycle and one said rinse cycle.

15. The water recovery system according to claim 14, wherein said pump configuration comprises a first liquid pump connected to said storage tank and operatively connectable to said washing machine by said first signal line, said first liquid pump being activated in response to said rinse water signals to pump said recovered wash water from said storage tank to the waste drain during said rinse cycle wherein said recovered wash water becomes waste water; and a second liquid pump connected to said storage tank and operatively connect-able to said washing machine by said second signal line, said second liquid pump being activated in response to said hot water signals to pump said recovered rinse water from said storage tank to a the wash tub of said washing machine for reuse during said wash cycle wherein said recovered rinse water becomes recirculated water reused by said washing machine.

16. The water recovery system according to claim 12, wherein said rinse water that is recovered in said storage tank is first reused in a subsequent wash cycle before being discharged to the waste drain to reduce a total amount of fresh water used by said washing machine during said full cycle of the washing machine, said full cycle comprising at least one said wash cycle and one said rinse cycle.

17. The water recovery system according to claim 12, wherein said pump configuration comprises a first liquid pump connected to said storage tank and operatively connectable to said washing machine by said first signal line, said first liquid pump being activated in response to said rinse water signals to pump said recovered wash water from said storage tank to the waste drain during said rinse cycle wherein said recovered wash water becomes waste water; and a second liquid pump connected to said storage tank and operatively connect-able to said washing machine by said second signal line, said second liquid pump being activated in response to said hot water signals to pump said recovered rinse water from said storage tank to a the wash tub of said washing machine for reuse during said wash cycle wherein said recovered rinse water becomes recirculated water reused by said washing machine.

18. The water recovery system according to claim 12, wherein tank inlet is accessible from an exterior of said washing machine for connection to the wastewater hose.

19. The water recovery system according to claim 12, wherein said storage tank is filled first by rinse water.

20. The water recovery system according to claim 12, wherein saidwater recovery system is provided in combination with a washing machine having a wastewater hose on an exterior thereof, said wastewater hose being removably engagable to said waste drain for discharging said rinse water and said wash water directly to the waste drain during normal operation and being removable engagable with said tank inlet for recovery of said rinse water and said wash water.

* * * * *